United States Patent
Ryl

(10) Patent No.: US 11,084,457 B2
(45) Date of Patent: Aug. 10, 2021

(54) RESTRAINT DEVICE FOR A VEHICLE

(71) Applicant: VOLKSWAGEN AKTIENGESELLSCHAFT, Wolfsburg (DE)

(72) Inventor: Axel Ryl, Burgdorf (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 54 days.

(21) Appl. No.: 16/712,307

(22) Filed: Dec. 12, 2019

(65) Prior Publication Data

US 2020/0114867 A1  Apr. 16, 2020

Related U.S. Application Data

(63) Continuation of application No. PCT/EP2018/065372, filed on Jun. 11, 2018.

(30) Foreign Application Priority Data

Jun. 12, 2017 (DE) ...................... 10 2017 209 867.8

(51) Int. Cl.
   *B60R 22/46* (2006.01)
   *B60R 21/013* (2006.01)
   (Continued)

(52) U.S. Cl.
   CPC ............ *B60R 22/46* (2013.01); *B60R 21/013* (2013.01); *B60R 21/0134* (2013.01);
   (Continued)

(58) Field of Classification Search
   CPC . B60R 21/013; B60R 21/015; B60R 21/0134; B60R 21/207; B60R 21/231;
   (Continued)

(56) References Cited

U.S. PATENT DOCUMENTS

| 6,447,011 | B1 * | 9/2002 | Vollimer | B60R 22/46 |
| | | | | 280/806 |
| 6,565,121 | B2 * | 5/2003 | Knych | B60R 22/1951 |
| | | | | 280/806 |
| 2020/0114867 | A1 * | 4/2020 | Ryl | B60R 22/48 |

FOREIGN PATENT DOCUMENTS

| CN | 111094060 A | * 5/2020 | ............. B60N 2/427 |
| DE | 19645386 A1 | 10/1997 | |

(Continued)

*Primary Examiner* — Ruth Ilan
*Assistant Examiner* — Scott F. Underwood
(74) *Attorney, Agent, or Firm* — Muncy, Geissler, Olds & Lowe, P.C.

(57) ABSTRACT

A restraint system for a vehicle, with which in a pre-crash phase prior to a predicted front crash time a vehicle occupant resting on a vehicle seat can be raised from a comfort position to an upright operative position by a forward displacer, in which in a crash phase a seat belt fastened on the vehicle occupant exerts a restraining effect on the vehicle occupant, in which an electromotive reversible belt pretensioner is activated to limit the restraining force exerted on the vehicle occupant to a predefined force level, namely by means of forward displacement of the vehicle occupant along a belt force limiting travel. In accordance with the invention, when raising the vehicle occupant to the operative position in the pre-crash phase, the electromotively reversible belt pretensioner generates a pre-crash belt slack so as to provide the pre-crash belt pullout travel required for raising the vehicle occupant in a restraining-force-free manner.

6 Claims, 5 Drawing Sheets

(51) Int. Cl.
   *B60R 22/48*      (2006.01)
   *B60R 21/0134*   (2006.01)
   *B60R 22/26*      (2006.01)
   *B60R 21/207*     (2006.01)
   *B60R 21/01*      (2006.01)

(52) U.S. Cl.
   CPC .............. *B60R 22/26* (2013.01); *B60R 22/48* (2013.01); *B60R 21/207* (2013.01); *B60R 2021/01231* (2013.01); *B60R 2021/01252* (2013.01); *B60R 2021/01265* (2013.01)

(58) Field of Classification Search
   CPC ........... B60R 2021/01265; B60R 2021/01252; B60R 22/46
   USPC .................................................. 280/731, 735
   See application file for complete search history.

(56) References Cited

FOREIGN PATENT DOCUMENTS

| | | | |
|---|---|---|---|
| DE | 19816277 C1 | 11/1999 | |
| DE | 10329023 A1 | 1/2005 | |
| DE | 102005007428 A1 | 8/2006 | |
| DE | 102006051240 A1 | 5/2008 | |
| DE | 102007002185 A1 * | 7/2008 | ............... B60N 2/42 |
| DE | 102011108915 A1 | 1/2013 | |
| DE | 102011122203 A1 | 6/2013 | |
| DE | 102013224666 A1 | 6/2015 | |
| DE | 102014002187 A1 | 8/2015 | |
| DE | 102015004798 A1 | 12/2015 | |
| EP | 1580090 A1 * | 9/2005 | ............. B60R 22/26 |
| EP | 3309018 A1 * | 4/2018 | ............. B60R 22/46 |
| EP | 3689684 A1 * | 8/2020 | ........... B60R 22/195 |
| JP | 2020179826 A * | 11/2020 | ............. B60R 21/08 |

* cited by examiner

RESTRAINT DEVICE FOR A VEHICLE

This nonprovisional application is a continuation of International Application No. PCT/EP2018/065372, which was filed on Jun. 11, 2018, and which claims priority to German Patent Application No. 10 2017 209 867.8, which was filed in Germany on Jun. 12, 2017, and which are both herein incorporated by reference.

BACKGROUND OF THE INVENTION

Field of the Invention

The present invention relates to a restraint system for a vehicle and to a method for restraining a vehicle occupant resting on a vehicle seat.

Description of the Background Art

In two-track vehicles with at least partially automated driving functions, the driver can be relieved of the driving task so that the driver can assume comfortable sitting positions in the vehicle, i.e., can adjust the vehicle seat rearward, up to a lying position. For this sitting position, an occupant restraint system is provided that ensures proper restraining action for the vehicle occupant in the event of a frontal crash.

A generic restraint system for a vehicle is known from DE 10 2014 002 187 A1 with which in a pre-crash phase prior to a possible frontal crash event a vehicle occupant resting on a vehicle seat can be brought from a position of comfort to an upright operative position by a forward displacer. The operative position is designed such that in the event of a crash, a seat belt worn by the vehicle occupant exercises an optimum restraint effect on the strapped-in occupant. The seat belt used in DE 10 2014 002 187 A1 is a three-point seat belt with a lap belt portion and a shoulder belt portion. The lap belt portion runs in the fastened state between the lateral attachment points transversely across the pelvis of the vehicle occupant. The shoulder belt portion runs in the fastened state diagonally across the upper body of the vehicle occupant up to an upper attachment point. In addition, the restraint system can have an electronically controllable and electromechanically reversible belt pretensioner, which in the event of a crash pulls the vehicle occupant firmly against the back of the vehicle seat with a predefined restraining force. By means of the electromechanically reversible belt pretensioner, the restraining force exerted on the vehicle occupant can also be limited to a defined force level. The belt force limitation takes place by providing a predefined belt force limiting travel and by means of the forward displacement of the vehicle occupant.

From DE 10 2015 004 798 A1, a method for controlling an airbag is known, wherein the triggering of the airbag can be suppressed according to the situation, provided the vehicle occupant is outside of the airbag effective range.

SUMMARY OF THE INVENTION

It is therefore an object of the present invention to provide a restraint system for a vehicle and a method of restraining a vehicle occupant which protects the vehicle occupant in a simple manner in the event of a frontal crash regardless of his sitting position in the vehicle.

According to an exemplary embodiment, in the pre-crash phase, the electromechanically reversible belt pretensioner is disabled when the vehicle occupant is raised to the upright operative position and a pre-crash path is formed in the seat belt. This way, a pre-crash belt pullout travel required for raising the vehicle occupant to an upright position is provided without any restraining force. This ensures that during the pre-crash phase, the vehicle occupant can be raised to the upright operative position instantaneously. In the pre-crash situation, belt webbing is reversibly retracted electromotively by means of the electric-motor-driven reversible belt pretensioner. In the event of a crash, the belt pretensioner is triggered pyrotechnically and retracts this webbing. For the control of the belt to be free of force during the phase when the occupant is being moved upright and to then again be switched to "active" upon reaching the operative position, the control must take place via a webbing transmitter or via a corresponding control unit.

In a simple technical implementation, a forward displacer may be, for example, an inflatable air cushion integrated in the back rest of the vehicle seat. The inflatable cushion is an active part of the restraint system and may optionally be inflated pneumatically or pyrotechnically. The cushion inflated during the pre-crash phase acts as a pulse generator for raising the vehicle occupant to the upright operative position.

To support the forward displacer (i.e., of the air cushion), during the pre-crash phase, the back rest of the vehicle can additionally be controlled electronically, so that the raising movement of the vehicle occupant is accelerated by an additional tilt adjustment of the back rest.

The restraint system according to the invention is designed such that preferably a conventional three-point seat belt is used as a seat belt, which in the fastened state is divided at a belt tongue into a lap belt portion and a shoulder belt portion. In the fastened state, the lap belt portion extends between lateral attachment points across the pelvis of the vehicle occupant, wherein the above-mentioned belt tongue forms a first releasable attachment point in connection with a belt buckle fastened to the vehicle seat or to the vehicle body. The attachment point of the second lap belt portion lying laterally opposite can be formed by means of an end fitting pretensioner, which, for example, is pyrotechnically activated in the event of a crash so as to pull a belt slack from the lap belt portion, whereby forward displacement of the pelvis is reduced. In the fastened state, the shoulder belt portion of the seat belt can extend starting from the seat belt tongue diagonally across the upper body of the vehicle occupant up to an upper attachment point and onward up to the electromotively reversible belt pretensioner. The provision of the electromotively reversible belt pretensioner and, for example, the pyrotechnically activatable end fitting tightener produces a dual tightening.

It is particularly preferred if the end fitting pretensioner is activated already in the pre-crash phase when raising the vehicle occupant to the upright operative position. In this way, a perfect raising movement of the vehicle occupant is guaranteed, in which the occupant's upper body moves toward the front of the vehicle by rotating.

The raising movement of the vehicle occupant to the upright operative position is also supported if the belt tongue is realized as a clamping tongue. Such a clamping tongue has a clamping element which is adjustable between a release position and a clamping position. In the release position of the seat belt during normal driving, the seat belt can slip freely through the eye of the clamping tongue. In the event of a crash, however, the clamping tongue is in its clamping position, in which the seat belt is clamped. In this way, in the pre-crash phase, the pre-crash belt slack (generated by the electromotively reversible belt pretensioner) in the shoulder belt portion cannot be transferred to the lap belt portion. The lap belt portion stays taught.

The restraint system may further comprise a head impact airbag module whose head impact airbag protects the head of the occupant in the event of a crash against the impact of an interior component (for example, an instrument panel). As long as the restraint system detects sufficient distance between the vehicle occupant and the interior component, the head impact airbag can preferably remain deactivated. This increases the maximum belt force limiting travel available in the crash phase, by means of which the vehicle occupant can be displaced forward free of impact.

The restraint system can have a crash detection device with the aid of which a pre-crash situation can be detected by means of radar, ultrasound, video or other distance sensors. As a function of the detected pre-crash situation, the electromotively reversible belt pretensioner, the forward displacer (that is, the inflatable cushion), the end fitting pretensioner, and optionally the back rest of the vehicle seat and the head impact airbag module, can electronically controlled, all of which can constitute components of the occupant restraint system.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
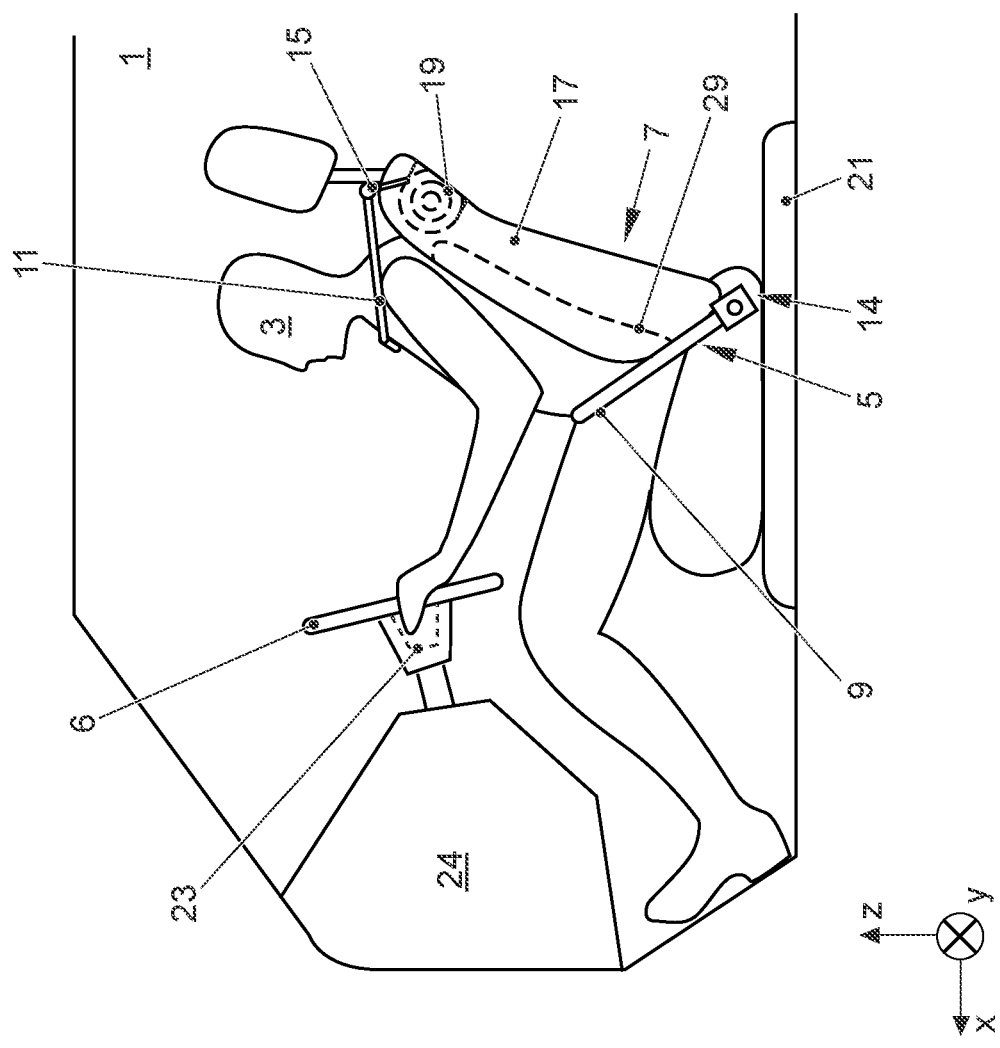
FIG. 1 shows a schematic side view of a vehicle interior of a two-track vehicle, in which a driver is in the normal sitting position.

In a schematic diagram, FIG. 1 shows a vehicle interior 1 with a driver 3 who is secured to the driver's seat 7 by a seat belt 5. The seat belt 5 is a three-point seat belt formed of a lap belt portion 9 and a shoulder belt portion 11. The lap belt portion 9 of the seat belt 6 runs between attachment points 13, 14 on the floor, of which only the point of attachment 13 is shown in FIG. 1 and which can be released via a seat belt tongue 27 and a buckle 28 in accordance with FIG. 2. The shoulder belt portion 11 of the seat belt 5 is guided in the diagonal direction of the one shown in FIG. 2 under articulation point 13, diagonally across the thoracic zone of the driver 3 to an upper attachment point 15, which is designed as a deflection fitting on an upper edge of the back rest 17 of the driver's seat 7. The shoulder belt portion 11 extends beyond the upper attachment point 15 to an electromotively reversible belt pretensioner 19. In a crash-induced activation, the electromotively reversible belt pretensioner 19 limits a restraining force $F_R$ (FIG. 4 or 5) exerted on the vehicle occupant 3 to a predefined force level, namely by means of the forward displacement of the vehicle occupant 3 along a belt force limiting travel $\Delta_{SB}$.

As is further apparent from FIG. 1, an only indicated electromotively actuatable adjusting device 21 is provided, with which both the driver's seat 7 is adjustable in the vehicle longitudinal direction x and its back rest 17 is tilt-adjustable. A head impact airbag module 23 is further installed in a steering wheel 8 of the vehicle, of which in the event of a frontal crash situation the head impact airbag protects the occupant's head against the impact of the instrument panel 24 or the steering wheel 8.

Figure 2:
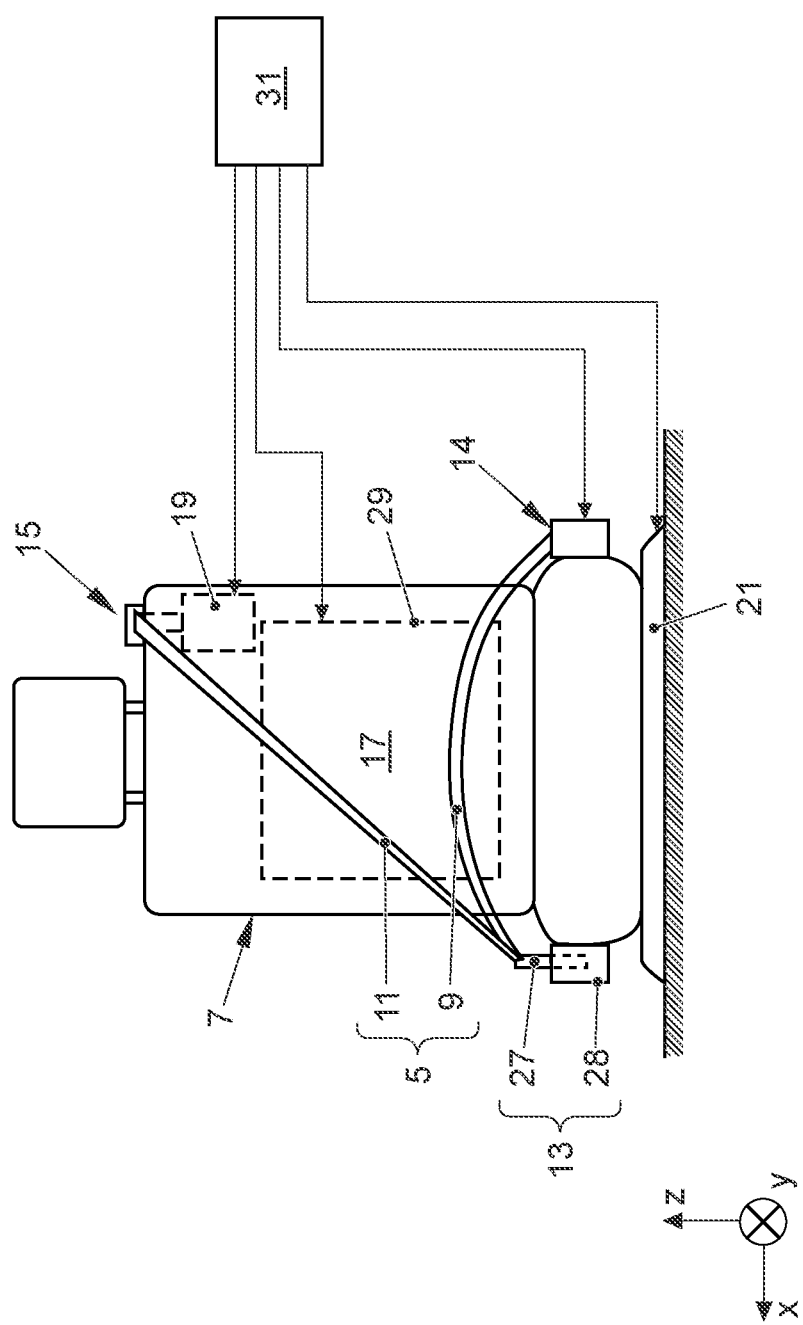
FIG. 2 shows a schematic front view of the driver's seat with the seat belt fastened, but without the driver.

FIG. 2 shows the two attachment points 13, 14 opposite each other in the vehicle transverse direction, between which the lap belt portion 9 extends. The attachment point 14 opposite the releasable attachment point 13 is realized as an end fitting pretensioner that pulls a belt slack from the lap belt portion 9 in the event of a crash and thus reduces crash-related forward displacement of the pelvis. The detailed structure of such an end fitting pretensioner is known in the art, for example, from DE 10 2014 201 231 A1.

The belt tongue 27 is realized in the figures as a clamping tongue, which in normal driving operation is in a release position in which the seat belt 6 can move freely through the clamping tongue. In the event of a crash, by contrast, the seat belt 9 is clamped. The detailed structure of such a clamping tongue is known in the art, for example from DE 42 15 384 A1 or DE 10 2013 216 326 A1.

The end fitting pretensioner 14, the mechanically reversible belt pretensioner 19, the head impact airbag module 23 and an air cushion 29 integrated in the back rest 17 and the seat adjusting device 21 are all incorporated in an occupant restraint system. The occupant restraint system includes a crash detection device 31 indicated in FIG. 2 which is signally connected with the mechanically reversible belt pretensioner 19, the end fitting pretensioner 14, the air cushion 29 as well as the adjusting device 21 and the airbag module 23. The crash detection device 31 detects a pre-crash situation by means of radar, ultrasound, video or other distance sensors. As a function of the detected pre-crash situation, the abovementioned components of the occupant restraint system can be actuated in order to move the driver 3 to a favorable position in advance of an approaching accident.

Figure 3:
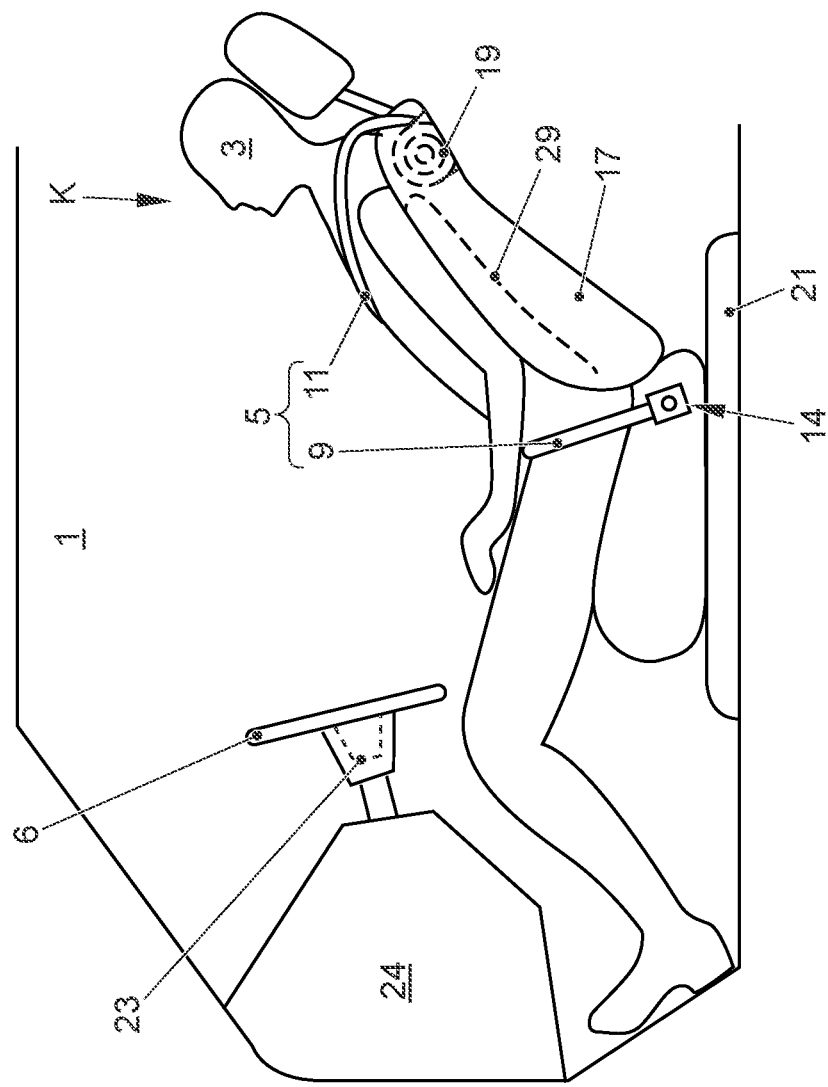
FIGS. 3 to 5 show, in each case views corresponding to FIG. 1, which illustrate a pre-crash phase ($\Delta t_P$ according to FIGS. 3 and 4) and a crash phase ($\Delta t_C$ according to FIG. 5).
Figure 4:
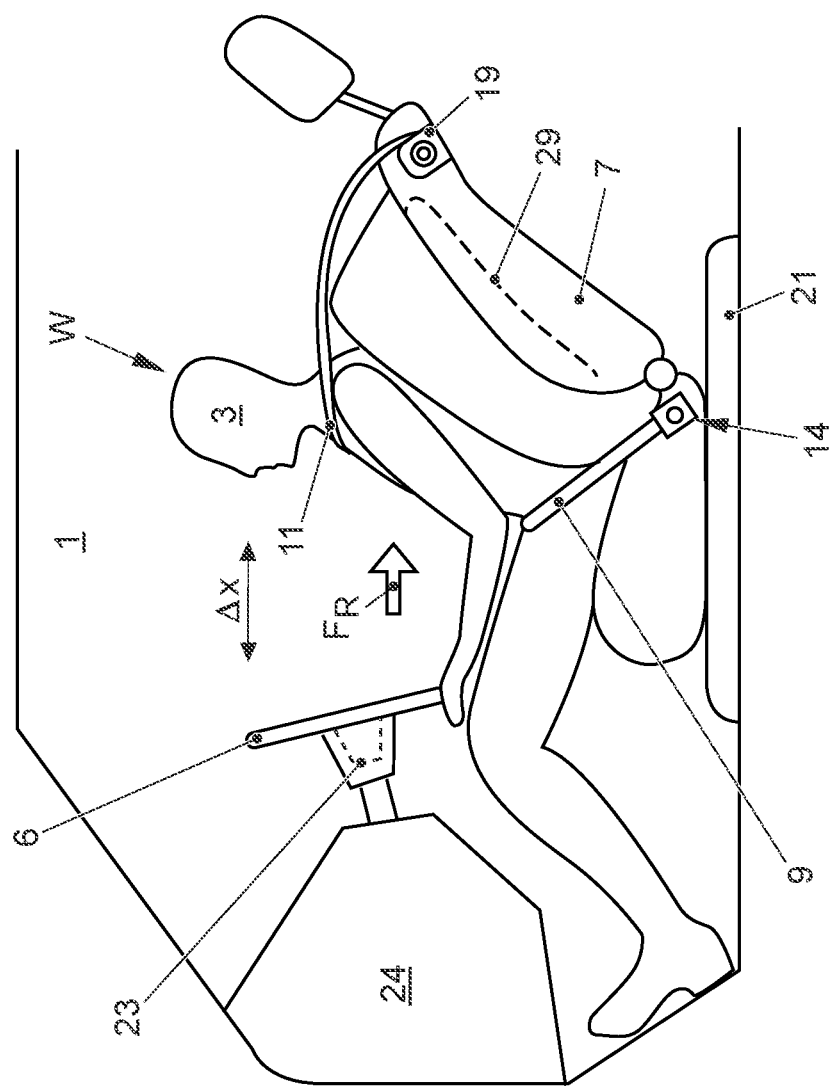
Figure 5:
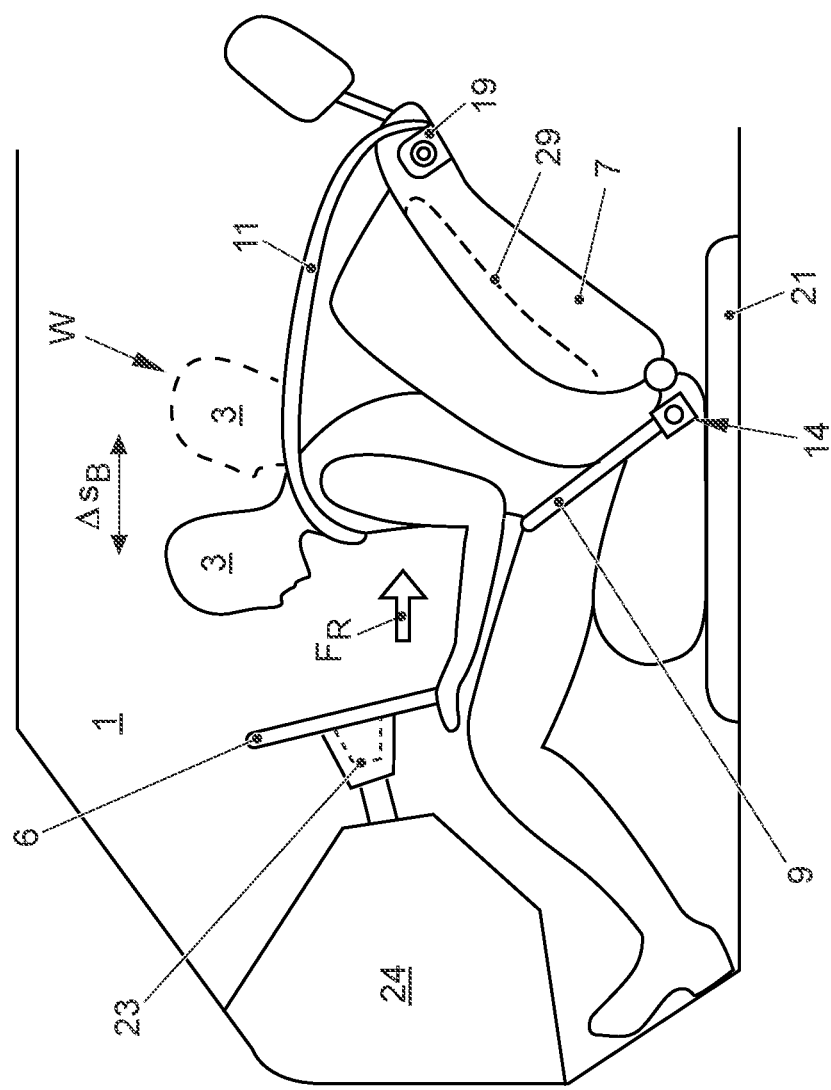

Below, the operation of the restraint system will be explained with reference to FIGS. 3 to 5: Thus, in FIG. 3, the driver 3 resting on the driver's seat 7 is in a comfort position K, in which the back rest 17 is folded backwards. Upon detecting a critical driving situation, the crash detection device 31 starts a pre-crash phase $\Delta t_P$ in which the air cushion 29 integrated in the back rest 17 is activated to raise the driver 3 from the comfort position K to an upright operative position W (FIG. 4). Simultaneously with the control of the air cushion 29, the electromotively reversible belt pretensioner 19 is deactivated to produce a pre-crash slack in the shoulder belt portion 11 of the seat belt 5. Thereby, a pre-crash belt slack travel required for the raising of the restrained driver 3 is provided free of restraint. The pre-crash belt slack thus generated must not be transferred from the shoulder belt portion 11 to the lap belt portion 9. This is prevented according to the invention by designing the belt tongue 27 as a clamping tongue, which stops the seat belt from slipping through an eye of the clamping tongue. As a result, the shoulder belt portion 11 of the seat belt 5 is loosened, whereas the lap belt portion 9 of the seat belt 5 is blocked by means of the clamping tongue 27.

In addition, in the pre-crash phase $\Delta t_P$, the end fitting pretensioner 14 is also activated to support an instantaneous raising movement of the driver 3 to the upright operative position W.

In the upright operative position W shown in FIG. 4, a perfect restraining effect of the three-point seat belt 9 is guaranteed. The electromotively reversible belt pretensioner 19 still deactivated in the pre-crash phase $\Delta t_P$ is activated at the time of the crash or immediately thereafter in the subsequent crash phase $\Delta t_C$ to exert a restraining effect on the driver 3 in which the electromotively reversible belt pretensioner 19 limits the restraining force $F_R$ exerted on the driver 3 to a predefined force level. The belt force limitation is carried out with a crash belt pullout travel and by means of the forward displacement of the restrained driver 3 along a belt force limiting travel $\Delta s_B$.

Provided that the crash detection device 31 detects a sufficiently large distance $\Delta x$ (FIG. 4) between the driver 3 and the instrument panel 24 or the steering wheel 8, the head impact airbag module 23 remains deactivated. In this manner, the maximum belt force limiting travel available by which the driver 3 can be displaced forward free of impact is increased in the crash phase $\Delta t_C$.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A restraint system for a vehicle, the restraint system comprising:
   a forward displacer, with which in a pre-crash phase prior to a predicted front crash phase, a vehicle occupant resting on a vehicle seat is raised from a comfort position, in which a back rest of the vehicle seat is folded back, to an upright operative position, wherein, in the crash phase, a seat belt fastened on the vehicle occupant exerts a restraining effect on the vehicle occupant; and
   an electromotively reversible belt pretensioner that is activated in order to limit the restraining force exerted on the vehicle occupant to a predefined force level during forward displacement of the vehicle occupant along a belt force limiting travel,
   wherein, when raising the vehicle occupant to the upright operative position in the pre-crash phase, the electromotively reversible belt pretensioner generates a pre-crash belt slack in a shoulder belt portion of the seat belt to provide a pre-crash belt pullout travel necessary for raising the vehicle occupant in a restraining-force-free manner,
   wherein the forward displacer is an inflatable cushion integrated in the back rest of the vehicle seat that is inflated in the pre-crash phase and acts as a pulse generator for raising the vehicle occupant to the upright operative position, and
   wherein for supporting the forward displacer, the back rest of the vehicle seat is controlled to accelerate the raising of the vehicle occupant to the upright operative position by adjusting an incline of the back rest.

2. The restraint system according to claim 1, wherein the seat belt is a three-point seat belt with a lap belt portion and the shoulder belt portion, wherein the lap belt portion in a fastened state extends between lateral attachment points transversely across a pelvis of the vehicle occupant, of which a first attachment point is a releasable buckle-belt tongue connection having a seat belt tongue and a buckle, wherein the shoulder belt portion extends in the fastened state diagonally across the upper body of the vehicle occupant up to an upper attachment point and onward to the electromotively reversible belt pretensioner, and wherein a second attachment point of the lap belt portion is a pyrotechnically activatable end fitting pretensioner which pulls a belt slack out of the lap belt portion in the event of a crash and thus reduces forward displacement of the pelvis.

3. The restraint system according to claim 2, wherein the pyrotechnically activatable end fitting pretensioner is activated already in the pre-crash phase when raising the vehicle occupant to the upright operative position so as to ensure proper raising of the vehicle occupant to the upright operative position.

4. The restraint system according to claim 2, wherein the seat belt tongue is a clamping tongue, which comprises a clamping element adjustable between a release position in which the seat belt is freely movable through the clamping tongue and a clamping position in which the seat belt is clamped in the event of a crash, so that in the pre-crash phase, the pre-crash belt slack generated in the shoulder belt portion does not transfer to the lap belt portion.

5. A restraint system for a vehicle, the restraint system comprising:
   a forward displacer, with which in a pre-crash phase prior to a predicted front crash phase, a vehicle occupant resting on a vehicle seat is raised from a comfort position, in which a back rest of the vehicle seat is folded back, to an upright operative position, wherein, in the crash phase, a seat belt fastened on the vehicle occupant exerts a restraining effect on the vehicle occupant; and
   an electromotively reversible belt pretensioner that is activated in order to limit the restraining force exerted on the vehicle occupant to a predefined force level during forward displacement of the vehicle occupant along a belt force limiting travel,
   wherein, when raising the vehicle occupant to the upright operative position in the pre-crash phase, the electromotively reversible belt pretensioner generates a pre-crash belt slack in a shoulder belt portion of the seat belt to provide a pre-crash belt pullout travel necessary for raising the vehicle occupant in a restraining-force-free manner, and
   wherein the restraint system further comprises a head impact airbag module having a head impact airbag that protects the head of the occupant, in the event of a crash, against an impact with an interior component, and wherein, if the restraint system detects a sufficiently large distance between the vehicle occupant and the interior component, the head impact air bag stays disabled thereby increasing a maximum belt force limiting travel available in the crash phase.

6. A method for restraining a vehicle occupant resting on a vehicle seat via a restraint system, the method comprising:
   raising, in a pre-crash phase prior to a predicted front crash phase, a vehicle occupant resting on a vehicle seat from a comfort position, in which a back rest of the vehicle seat is folded back, to an upright operative position by a forward displacer, wherein in the crash phase, a seat belt fastened on the vehicle occupant exerts a restraining effect on the vehicle occupant;
   activating an electromotively reversible belt pretensioner so as to limit the restraining force exerted on the vehicle occupant to a predefined force level during forward displacement of the vehicle occupant along a belt force limiting travel; and generating a pre-crash belt slack in a shoulder belt portion of the seat belt when raising the vehicle occupant to the upright operative position in the pre-crash phase via the electromotively reversible belt pretensioner so as to provide a pre-crash belt pullout travel necessary for raising the vehicle occupant in a restraining-force-free manner, wherein the forward displacer is an inflatable cushion integrated in the back rest of the vehicle seat that is inflated in the pre-crash phase and acts as a pulse generator for raising the vehicle occupant to the upright operative position, and wherein for supporting the forward displacer, the back rest of the vehicle seat is controlled to accelerate the raising of the vehicle occupant to the upright operative position by adjusting an incline of the back rest.

* * * * *